(12) United States Patent
Kuroda

(10) Patent No.: US 7,471,470 B2
(45) Date of Patent: Dec. 30, 2008

(54) LENS DEVICE AND LENS BARREL

(75) Inventor: Yasuto Kuroda, Saitama (JP)

(73) Assignee: Fujinon Corporation, Saitama (JP)

( * ) Notice: Subject to any disclaimer, the term of this patent is extended or adjusted under 35 U.S.C. 154(b) by 0 days.

(21) Appl. No.: 11/653,257

(22) Filed: Jan. 16, 2007

(65) Prior Publication Data
US 2007/0171550 A1 Jul. 26, 2007

(30) Foreign Application Priority Data
Jan. 16, 2006 (JP) ............................. 2006-007832

(51) Int. Cl.
*G02B 7/02* (2006.01)
(52) U.S. Cl. ...................... 359/811; 359/819
(58) Field of Classification Search ................ 359/694, 359/703, 811, 819, 827
See application file for complete search history.

(56) References Cited

U.S. PATENT DOCUMENTS

| | | | | |
|---|---|---|---|---|
| 3,601,343 A * | 8/1971 | Sivaslian | ..................... | 248/637 |
| 4,778,252 A * | 10/1988 | Filho | ........................... | 359/819 |
| 5,754,350 A * | 5/1998 | Sato | ........................... | 359/818 |
| 6,525,888 B2 * | 2/2003 | Schletterer | ................... | 359/822 |
| 6,560,045 B1 * | 5/2003 | Schletterer | ................... | 359/819 |
| 7,342,732 B2 * | 3/2008 | Dang et al. | ................. | 359/819 |

FOREIGN PATENT DOCUMENTS

JP 2000-187144 7/2000

* cited by examiner

*Primary Examiner*—David N Spector
(74) *Attorney, Agent, or Firm*—Young & Thompson

(57) ABSTRACT

A lens device includes elastic bracing struts arranged at regular intervals which are deformed by a lens element supported in a lens barrel so as thereby to hold down a periphery of the lens element in directions perpendicular to an optical axis of the lens element with elastic force when the lens element causes a diametrical change due to environmental variations, so that the lens element is prevented from being brought into misalignment, and besides retaining its optical performance.

10 Claims, 2 Drawing Sheets

LENS DEVICE AND LENS BARREL

BACKGROUND OF THE INVENTION

1. Field of the Invention

The present invention relates to a lens barrel for holding an optical lens element and a lens device comprising an optical lens element and a lens barrel.

2. Description of Related Art

In recent years because of a strong demand for a high optical performance and a decreased number of lens elements of a lens system for a liquid crystal projector, it is predominant to employ aspherical plastic lens elements. The problem encountered by such a plastic lens element is a higher expansion coefficient than glass lens elements and hardly adaptable to changes in environmental conditions such as ambient temperature and/or humidity. In consequence, the plastic lens element causes deterioration in lens performance resulting from a deviation of optical axis due to thermal expansion.

Japanese Unexamined Patent Publication No. 2000-187144 describes one of lens device structures for preventing a plastic lens and a lens barrel from having an adverse effect of expansion or contraction due to environmental changes such as temperature and humidity on each other. According the lens device structure, the lens device comprises a plastic lens element having a circumferential rim sure and a lens barrel fitted in the circumferential rim structure. This lens device is provided with a back k-lash between the circumferential rim structure and the lens barrel by which dimensional changes such as expansion and contraction of them due to changes in temperature and/or humidity are absorbed, so as thereby to retain initially attained axial concentricity for elimination of an adverse effect on optical performance of the lens device.

However, the optical lens element with a circumferential rim structure and the lens barrel to fit in the circumferential rim structure are not versatile in configuration and remain costly alternatives. It is conceivable to form an optical lens element and a lens barrel so as to leave a relatively wide clearance between a periphery of the optical lens element and the lens barrel for insertion of a separate ring-shaped retaining member in the clearance in order to retain the optical lens elements on the lens barrel. However, it goes counter to cost saving of the lens barrel, and besides leading to an increase in coaxial misalignment between the optical lens element and the lens barrel, to form the lens barrel so as to provide a clearance around a periphery of the optical lens element.

SUMMARY OF THE INVENTION

It is therefore an object of the present invention to prevention a lens device and a lens barrel which keeps an optical lens element held in the lens barrel in desired optical performance even when the optical lens element encounters a diametrical change due to environmental variations.

The foregoing object of the present invention is accomplished by a lens device comprising an optical lens element and a lens barrel for holding the optical lens element therein. The lens barrel has support means for supporting the optical lens element in a desired axial position and bracing means for firmly holding the optical lens element supported in the axial position in the lens barrel, wherein the bracing means comprises a plurality of elastic bracing struts formed as integral parts of the lens barrel so as to firmly hold down the periphery of the optical lens element in directions perpendicular to an optical axis of the optical lens element with elastic force.

The lens device may further comprise retaining means for holding down the optical lens element against the support means in a direction of the optical axis so as thereby to fixedly hold the optical lens element in the lens barrel.

According to the lens device or the lens barrel, the plastic lens element 2 is kept coaxially with the lens barrel even the optical lens element causes a diametrical change due to environmental variations, so as to maintain its optical performance regardless of environmental variations. Furthermore, since the optical lens element has a universal shape, i.e. a general disc shape, it is necessary to design only the lens barrel in shape adaptable enough for the optical lens element.

BRIEF DESCRIPTION OF THE DRAWINGS

The foregoing and other objects and features of the present invention will be clearly understood from the following detailed description when reading with reference to the accompanying drawings wherein same or similar parts or mechanisms are denoted by the same reference numerals throughout the drawings and in which.

DETAILED DESCRIPTION OF THE PREFERRED EMBODIMENTS

In the following description, parts or mechanisms of a projector which are not direct importance to the invention and parts or mechanisms of a projector which are purely of conventional construction will not be described in detail since their construction and operation can be easily be arrived at by those skilled in the art.

Figure 1:
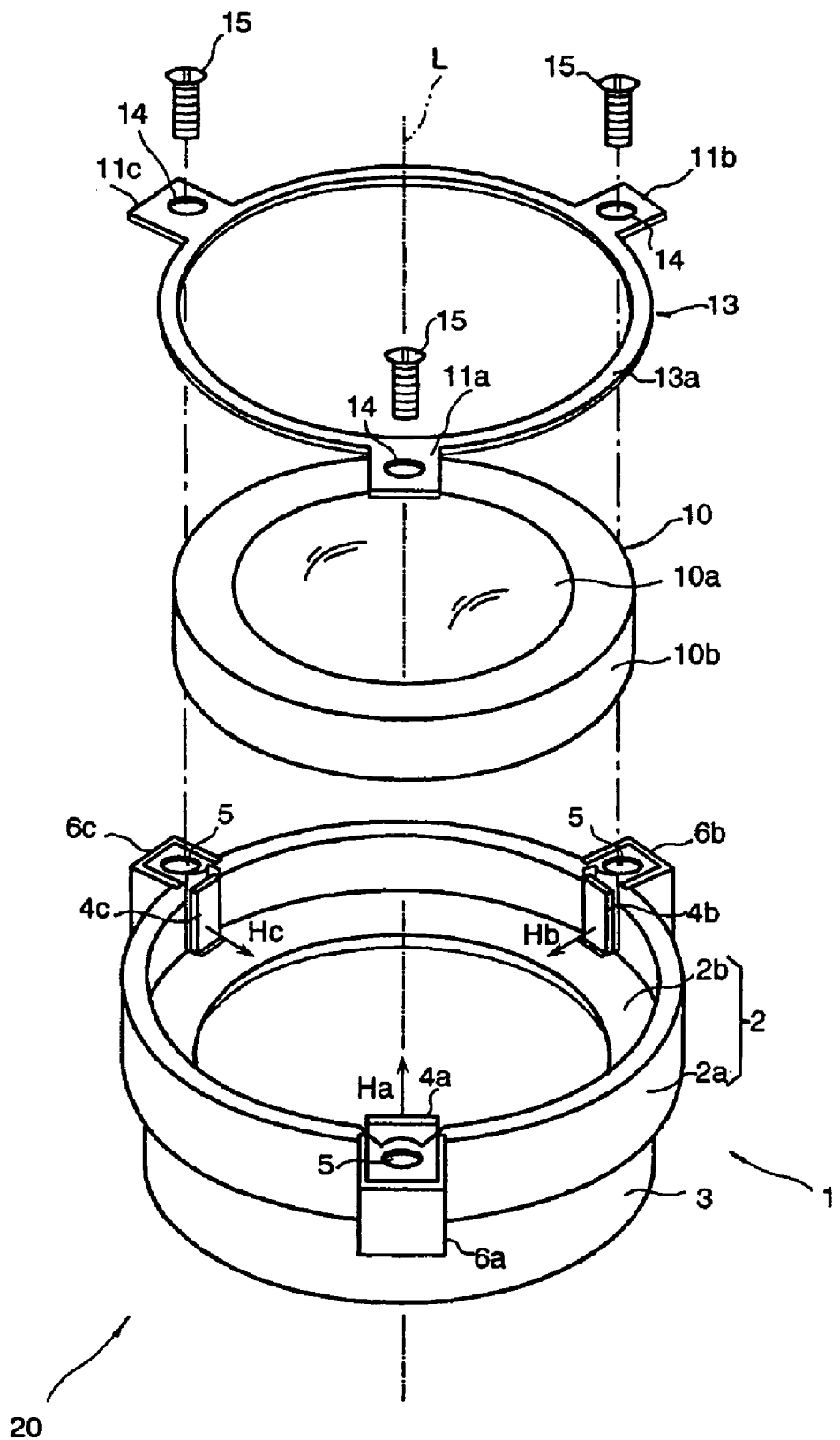
FIG. 1 is an exploded view of a lens device according to an embodiment of the present invention.
Figure 2:
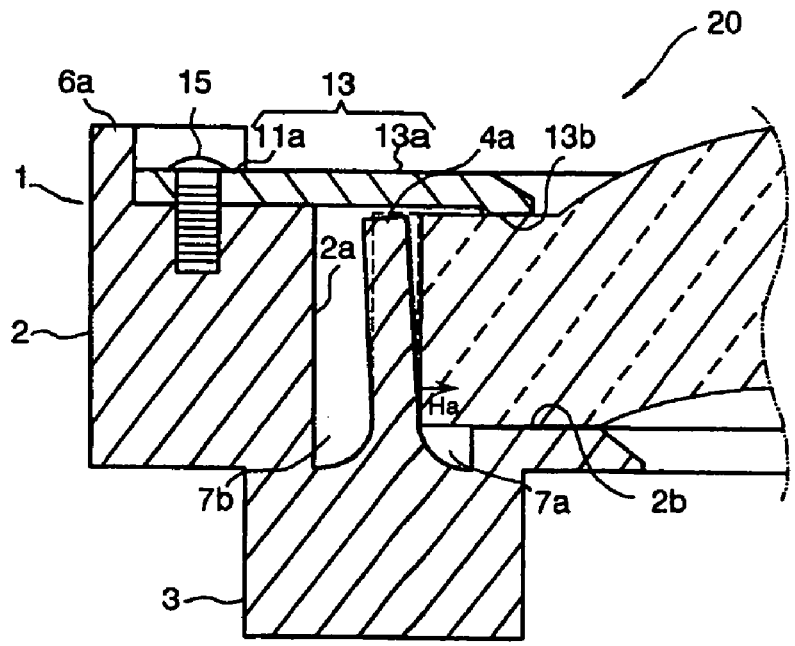
FIG. 2 is a longitudinal sectional view of the lens device with a plastic lens element installed in a lens barrel.

Referring to the accompanying drawings in detail, and in particular, to FIGS. 1 and 2 showing a lens device 20 according to an embodiment of the present invention, the lens device 20 comprises a lens barrel 1, an optical lens element 10 and a retainer ring 13. The optical lens element 10 comprises a convex lens portion 10a and a cylindrical flange portion 10b which are formed as an integral plastic element by injection molding. The lens barrel 1 for receiving and holding the optical lens element 10 is formed as an integral plastic member by injection molding. The lens barrel 1 comprises a lens holding barrel portion 2 formed by a coupled wall 2a and a medial annular collar 2b for receiving supporting the optical lens element 10 in a desired axial position therein and a coupling barrel portion 3 through which the lens barrel 1 is coupled to another lens barrel or the projector (not shown). The lens holding barrel portion 2 has a plurality of, more specifically three in this embodiment, elastic bracing struts 4a, 4b, and 4c extending vertically upward from the medial annular collar 2b which are disposed at regular angular intervals and slightly apart from the circumferential wall 2a, inner and outer grooves 7a and 7b (see FIGS. 2 and 3) formed on opposite sides of each of the strut 4a, 4b, and 4c in the annular collar 2b, and retainer mounting seats 6a, 6b, 6c of the same number as the bracing struts 4a, 4b, and 4c which are disposed in position correspondingly to the bracing struts 4a, 4b, and 4c, respectively, and project radially outward from the circumferential wall 2a. The bracing struts 4a, 4b, and 4c, are the same in material and dimensions as one anther. Each of the mounting seats 6a, 6b, and 6c is formed with a threaded bore 5. The bracing struts 4a, 4b, and 4c have inner surfaces circumscribed by a circle having a diameter slightly smaller than a specified outer diameter of the cylindrical flange portion 10b of the optical lens element 10 so that they are bent slightly outward when the optical lens element 10 made as designed is installed in the lens holding barrel portion 2.

Figure 3:
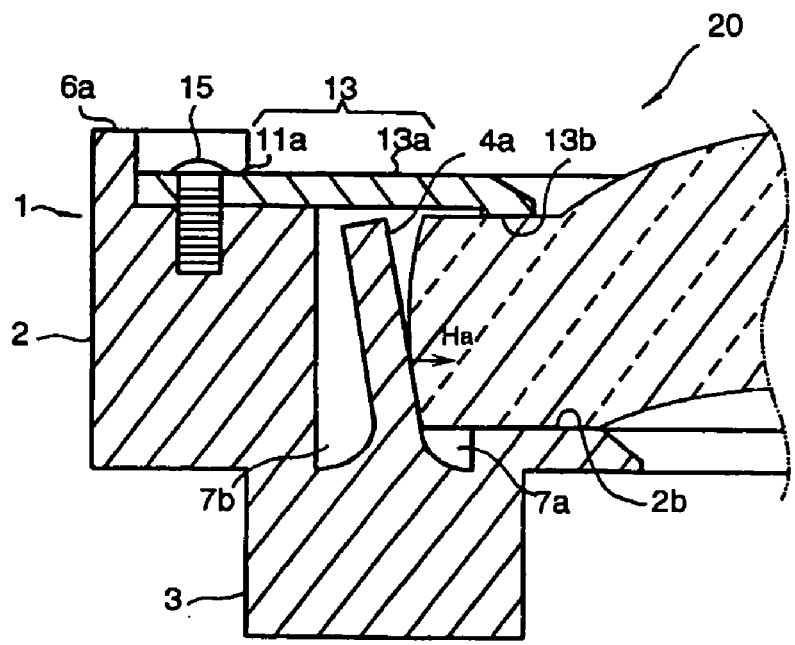
FIG. 3 is a longitudinal sectional view of the lens device when the plastic lens element fixedly held is expanded in the lens barrel.

The retainer ring 13 comprises a retaining ring portion 13a having an internal diameter smaller than the outer diameter of the cylindrical flange portion 10b of the optical lens element 10 and claws 11a, 11b and 11c of the same number as the bracing struts which extend radially outward from the retaining ring portion 13a and are disposed at regular angular intervals. Each of the claws 11a, 11b and 11c has a screw hole 14. As seen in FIGS. 2 and 3, the retaining ring portion 13a has an annular pressure foot 13b at its underneath.

Referring to FIGS. 2 and 3, according to the lens device 20, when the plastic lens element 10 is installed in the lens barrel 1 until the flange portion 10b abuts against the medial annular collar 2b, the plastic lens element 10 is supported sideways by the bracing struts 4a, 4b and 4c at the flange portion 2b. Thereafter, when the retainer ring 13 is fixed to the lens barrel 1 by fastening set screws 15 into the threaded bores 5 of the retainer mounting seats 6a, 6b and 6c, respectively, through the screw holes 14, or otherwise by an adhesive, the retainer ring 13 holds down the flange portion 10b of the plastic lens element 10 against the medial annular collar 2b at the annular pressure foot 13b. At this time, the plastic lens element 10 forces the bracing struts 4a, 4b and 4c radially outward at the flange portion 10b so as thereby to elastically deflect them slightly outward as shown by a double-dashed line in FIG. 2. In consequence, because the bracing struts 4a, 4b and 4c are the same in material and dimensions as one another, the bracing struts 4a, 4b and 4c exert restoring force on the flange portion 10b of the plastic lens element 10 equally in radial directions Ha, Hb and Hc (see FIG. 1) perpendicular to the optical axis L, respectively, so as thereby to clamp the plastic lens element 2 coaxially with the lens barrel 1.

FIG. 3 shows the lend device 13 with the bracing 4a, 4b, and 4c elastically deformed or bent due to thermal expansion in radial directions of the plastic lens element 10 resulting from a change in environmental condition such as ambient temperature. As shown, when the plastic lens element 10 expands equally in radial directions, and besides being elastically deformed equally outward by the radial 4b and 4c elastically deformed outward by the flange portion 10b of the plastic lens element 10. Because the bracing struts 4a, 4b and 4c are the same in material and dimensions as one another, they expand equally in radial directions, and besides being elastically deformed equally outward by the radial expansion of the plastic lens element 10, so that the bracing struts 4a, 4b, and 4c exert restoring force on the flange portion 10b of the plastic lens element 10 in balance in radial directions Ha, Hb and Hc perpendicular to the optical axis L, respectively. In consequence, the bracing struts 4a, 4b, and 4c hold the plastic lens element 10 in position coaxially with the lens barrel 1, so as to keep the plastic lens element in desired optical performance.

As just described above, the lens barrel 1 is capable of reliably keeping the plastic element 10 on a coaxial position by means of the bracing struts 4a, 4b and 4c regardless of diametrical changes of the plastic lens element 10 due to environmental changes.

Although the bracing struts 4a, 4b and 4c are arranged at regular angular intervals in this embodiment, it is of course that the number and positions of the bracing struts 4a, 4b and 4c are optional as long as the bracing struts 4a, 4b and 4c keep the plastic lens element 10 in a coaxial position in the lens barrel 1 optically stably.

It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

What is claimed is:

1. A lens device comprising:
a plastic optical lens element;
a lens barrel for holding said plastic optical lens element therein, said lens barrel having support means for supporting said plastic optical lens element in axial position therein and bracing means for holding said plastic optical lens element supported in said axial position; and
means for holding down said plastic optical lens element against said support means in an optical axis of said plastic optical lens element with elastic force;
wherein said bracing means comprises a plurality of elastic bracing struts integrally formed as integral part of said lens barrel and operative to hold down a periphery of said plastic optical lens element in directions perpendicular to said optical axis with elastic force.

2. A lens barrel for holding a plastic optical lens element, said lens barrel comprising:
support means for supporting said plastic optical lens element in an axial position in said lens barrel;
bracing means for holding said plastic optical lens element supported in said axial position by said support means; and
retaining means for holding down said plastic optical lens element against said support means in a direction of an optical axis of said plastic optical lens element so as thereby to fixedly hold said optical lens element in said lens barrel;
wherein said bracing means comprises a plurality of elastic bracing struts formed as integral parts of said lens barrel so as to hold down a periphery of said optical lens element in directions perpendicular to said optical axis with elastic force.

3. A lens device comprising: a plastic optical lens element comprising a lens portion and an integral cylindrical flange portion;
a lens barrel comprising a lens holding barrel portion defined by a coupled circumferential wall integrally formed with an annular collar;
the lens holding barrel portion comprising a plurality of elastic bracing struts integrally formed with and extending vertically upward from said annular collar and disposed at regular angular intervals and spaced apart from said circumferential wall; and
retaining means connected to said lens holding barrel portion for holding said optical lens element in a given position in a direction of an optical axis of said optical lens element with said flange portion of said optical lens element abutting against said annular collar, and with said flange portion of said optical lens element pressing with elastic force against said bracing struts, a periphery of said flange portion of the optical lens element elastically pressing said bracing struts radially outward in directions perpendicular to said optical axis, wherein said bracing struts exert a restoring force on said flange portion of the lens element equally in radial direction perpendicular to the optical axis coaxially to clamp the lens element within the lens barrel.

4. The lens barrel of claim 3, wherein the lens device further comprises inner and outer grooves located within the annular collar on opposite sides of each of the bracing strut.

5. The lens device of claim 4, wherein said retaining means further comprising retainer mounting seats disposed around said circumferential wall and aligned with said bracing struts, respectively, and a retainer ring connected to said mounting seats.

6. The lens device of claim 5, wherein,
the retainer ring comprises a retaining ring portion having an internal diameter smaller than an outer diameter of the cylindrical flange portion of the optical lens element, claws extending radially from the retaining ring portion and aligned with the bracing struts, respectively, and pressure feet located on an underneath side of the retaining ring portion and aligned with the claws, respectively, and
each claw is secured to a corresponding one of the retainer mounting seats so that each pressure foot presses the optical lens element against the annular collar of the lens barrel.

7. A lens barrel device for holding a plastic optical lens element comprising a lens portion and an integral cylindrical flange portion, said lens barrel device comprising:
a lens barrel comprising a lens holding barrel portion defined by a coupled circumferential wall integrally formed with an annular collar;
the lens holding barrel portion comprising plurality of elastic bracing struts integrally formed with and extending vertically upward from said annular collar and disposed at regular angular intervals and spaced apart from said circumferential wall; and
retaining means for holding the flange portion of the optical lens element abutting downward against the annular collar thereby positioning the optical lens element in a given position in a direction of an optical axis of said optical lens element,
wherein the bracing struts are elastically pressed by a periphery of the optical lens element in radial directions perpendicular to the optical axis to exert a restoring force on the periphery of the optical lens element equally in radial directions perpendicular to the optical axis thereby coaxially clamping the lens element within the lens barrel portion.

8. The lens barrel of claim 7, wherein the lens device further comprises inner and outer grooves located within the annular collar on opposite sides of each of the bracing strut.

9. The lens barrel device of claim 7, wherein said retaining means further comprising a retainer mounting seats disposed around said circumferential wall and aligned with said bracing struts, respectively, and a retainer ring connected to said mounting seats.

10. The lens barrel device of claim 9, wherein,
the retainer ring comprises a retaining ring portion having an internal diameter smaller than an outer diameter of the cylindrical flange portion of the optical lens element, claws extending radially from the retaining ring portion and aligned with the bracing struts, respectively, and pressure feet located on an underneath side of the retaining ring portion and aligned with the claws, respectively; and
each said pressure foot presses the flange portion of the optical lens element against the annular collar of the lens barrel.

* * * * *